(12) United States Patent
Dorum et al.

(10) Patent No.: US 10,223,816 B2
(45) Date of Patent: Mar. 5, 2019

(54) METHOD AND APPARATUS FOR GENERATING MAP GEOMETRY BASED ON A RECEIVED IMAGE AND PROBE DATA

(71) Applicant: HERE Global B.V., Eindhoven (NL)

(72) Inventors: Ole Henry Dorum, Chicago, IL (US); Ian Endres, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 244 days.

(21) Appl. No.: 14/622,026

(22) Filed: Feb. 13, 2015

(65) Prior Publication Data

US 2016/0239983 A1 Aug. 18, 2016

(51) Int. Cl.
| G06T 7/60 | (2017.01) |
|---|---|
| G06T 11/20 | (2006.01) |
| G06K 9/00 | (2006.01) |
| G01C 11/04 | (2006.01) |
| G01C 21/32 | (2006.01) |

(52) U.S. Cl.
CPC .............. *G06T 11/20* (2013.01); *G01C 11/04* (2013.01); *G01C 21/32* (2013.01); *G06K 9/00651* (2013.01)

(58) Field of Classification Search
CPC ...... G06T 11/20; G01C 21/00; G06K 9/00651
USPC ........................................................ 345/440
See application file for complete search history.

(56) References Cited

U.S. PATENT DOCUMENTS

| 5,748,109 A * | 5/1998 | Kosaka | .............. G01C 21/3635 340/988 |
|---|---|---|---|
| 7,359,555 B2 | 4/2008 | Porikli et al. | |
| 7,660,441 B2 * | 2/2010 | Chen | ..................... G06K 9/0063 382/113 |
| 8,675,995 B2 | 3/2014 | Chen et al. | |
| 8,730,258 B1 | 5/2014 | Cornell | |
| 2005/0100220 A1 | 5/2005 | Keaton et al. | |
| 2006/0078205 A1 * | 4/2006 | Porikli | ................. G03B 15/006 382/204 |
| 2007/0032946 A1 * | 2/2007 | Goto | ...................... G01C 21/32 701/93 |
| 2009/0132316 A1 * | 5/2009 | Florance | ................ G06Q 30/06 701/532 |
| 2009/0138497 A1 * | 5/2009 | Zavoli | .................. G09B 29/106 |
| 2009/0140887 A1 * | 6/2009 | Breed | .................. G01C 21/165 340/990 |

(Continued)

FOREIGN PATENT DOCUMENTS

WO WO 2011/160672 A 12/2011

OTHER PUBLICATIONS

Walter, Volker, "Object-based Classification of Remote Sensing Data for Change Detection", "ISPRS Journal of Photogrammetry and Remote Sensing", Jan. 2004, Elsevier, vol. 58, pp. 225-238, [retrieved on Aug. 29, 2017], Retrieved from Internet<URL:http://www.sciencedirect.com/science/article/pii/S0924271603000595>.*

(Continued)

*Primary Examiner* — Barry Drennan
*Assistant Examiner* — Terrell Robinson
(74) *Attorney, Agent, or Firm* — Alston & Bird LLP (57) ABSTRACT

A method, apparatus and computer program product are provided for generating map geometry based on a received image and probe data. A method is provided including receiving a first image and probe data associated with the first image, categorizing pixels of the first image based on the probe data, and generating a map geometry based on the pixel categorization of the first image.

17 Claims, 7 Drawing Sheets
(4 of 7 Drawing Sheet(s) Filed in Color)

(56) References Cited

U.S. PATENT DOCUMENTS

| | | | | |
|---|---|---|---|---|
| 2010/0266161 | A1* | 10/2010 | Kmiecik | G01C 21/26 382/103 |
| 2012/0004845 | A1 | 1/2012 | Kmiecik et al. | |
| 2012/0050285 | A1 | 3/2012 | Kannenberg | |
| 2013/0030690 | A1* | 1/2013 | Witmer | G01C 21/32 701/409 |
| 2013/0060540 | A1* | 3/2013 | Frahm | G06T 15/06 703/2 |
| 2013/0343641 | A1 | 12/2013 | Mnih et al. | |

OTHER PUBLICATIONS

Antonarakis, A.S., "Object-based Land Cover Classification Using Airborne LIDAR", "Remote Sensing of Environment", Jun. 16, 2008, Elsevier, vol. 112 issue 6, pp. pp. 2988-2998, [retrieved on Aug. 29, 2017], Retrieved from Internet<URL:http://www.sciencedirect.com/science/article/pii/S0034425708000667#!>.*

Davies, Jonathan J., Scalable, Distributed, Real-Time Map Generation, IEEE Pervasive Computing, 2006, vol. 5, pp. 47-54. [retrieved on Apr. 15, 2018], Retrieved from the Internet<URL:https://ieeexplore.ieee.org/abstract/document/1717365/>.*

Jin, H. et al., *Road Feature Extraction From high Resolution Aerial Images Upon Rural Regions Based on Multi-Resolution Image Analysis and Gabor Filters*, INTECH, Chap 17, pp. 387-414 (dated Jun. 2012); [retrieved Jun. 16, 2015]. Retrieved from the Internet: <http://cdn.intechnopen.com/pdfs/37525.pdf>.

Mnih, V. et al., *Learning to Detect Roads in High-Resolution Aerial Images* [retrieved Jun. 16, 2015]. Retrieved from the Internet: <https://www.cs.toronto.edu/~vmnih/docs/road_detection.pdf>. (dated 2010) 14 pages.

* cited by examiner

METHOD AND APPARATUS FOR GENERATING MAP GEOMETRY BASED ON A RECEIVED IMAGE AND PROBE DATA

TECHNOLOGICAL FIELD

An example embodiment of the present invention relates to map rendering and, more particularly, to generating map geometry based on a received image and probe data.

BACKGROUND

Figure 3:
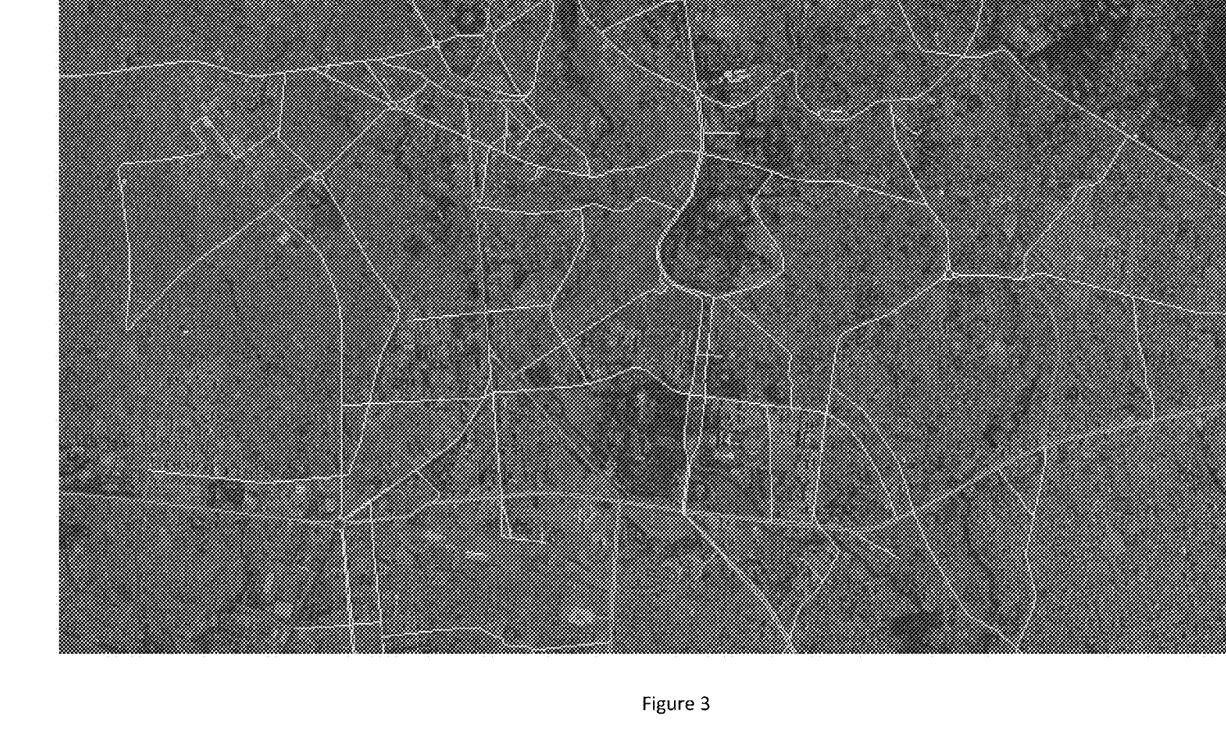
FIG. 3 illustrates an example map geometry with poor road coverage.

Some digital maps are generated using machine learning to identify target objects, such as roads in an image. Current applications may rely on known georeferenced road geometry to seed the machine learning process. The georeferenced road geometry may be overlaid on an image to identify road pixels for training. However, in many areas, such as developing countries, the georeferenced road geometry may be poor in quality, coverage, and/or placement. An example of poor map road coverage is provided in FIG. 3. In this example Addis Ababa is depicted in an aerial image, and due to poor road network coverage in this area, only the main roads are depicted. In instances in which there is poor road network coverage or imprecise placement of roads, the map geometry may not correspond to the actual roads of the aerial image.

BRIEF SUMMARY

A method and apparatus are provided in accordance with an example embodiment for generating map geometry based on a received image and probe data. In an example embodiment, a method is provided that includes receiving a first image and probe data associated with the first image, categorizing pixels of the first image based on the probe data, and generating a map geometry based on the pixel categorization of the first image.

In an example embodiment, the method also includes receiving a second image, categorizing pixels of the second image based on the categorization of the pixels of the first image, and generating a map geometry based on the pixel categorization of the second image. In some example embodiments of the method, the categorizing pixels of the first image is based on probe data density. In an example embodiment, the method also includes determining a target center based on probe data density and the categorizing pixels is based on the target center.

In some example embodiments of the method, the categorizing pixels includes categorizing pixels as target pixels and non-target pixels. In an example embodiment of the method, the method further includes determining a target confidence value of pixels of the first image based on the probe data, and the categorizing pixels is based on the target confidence value of the respective pixel satisfying a predetermined target confidence value threshold. In some example embodiments, the method also includes updating or generating map data based on the map geometry.

In another example embodiment an apparatus is provided including at least one processor and at least one memory including computer program code, with the at least one memory and computer program code configured to, with the processor, cause the apparatus to at least receive a first image and probe data associated with the first image, categorize pixels of the first image based on the probe data, and generate a map geometry based on the pixel categorization of the first image.

In some example embodiments of the apparatus, the at least one memory and the computer program code are further configured to receive a second image, categorize pixels of the second image based on the categorization of the pixels of the first image, and generate a map geometry based on the pixel categorization of the second image. In an example embodiment of the apparatus, the categorizing pixels of the first image is based on probe data density. In some example embodiments of the apparatus, the at least one memory and the computer program code are further configured to determine a target center based on probe data density and the categorizing pixels is based on the target center.

In an example embodiment of the apparatus, the categorizing pixels includes categorizing pixels as target pixels and non-target pixels. In some example embodiments of the apparatus, the at least one memory and the computer program code are further configured to determine a target confidence value of pixels of the first image based on the probe data, and the categorizing pixels is based on the target confidence value of the respective pixel satisfying a predetermined target confidence value threshold. In an example embodiment of the apparatus, the at least one memory and the computer program code are further configured to update or generate map data based on the map geometry.

In a further example embodiment, a computer program product is provided including at least one non-transitory computer-readable storage medium having computer-executable program code portions stored therein, with the computer-executable program code portions comprising program code instructions configured to receive a first image and probe data associated with the first image, categorize pixels of the first image based on the probe data and generate a map geometry based on the pixel categorization of the first image.

In an example embodiment of the computer program product, the computer-executable program code portions further comprise program code instructions configured to receive a second image, categorize pixels of the second image based on the categorization of the pixels of the first image, and generate a map geometry based on the pixel categorization of the second image. In some example embodiments of the computer program product, the categorizing pixels of the first image is based on probe data density. In an example embodiment of the computer program product, the computer-executable program code portions further comprise program code instructions configured to determine a target center based on probe data density, and the categorizing pixels is based on the target center.

In some example embodiments of the computer program product the categorizing pixels includes categorizing pixels as target pixels and non-target pixels. In an example embodiment of the computer program product, the computer-executable program code portions further comprise program code instructions configured to determine a target confidence value of pixels of the first image based on the probe data, and the categorizing pixels is based on the target confidence value of the respective pixel satisfying a predetermined target confidence value threshold. In some example embodiments of the computer program product, the computer-executable program code portions further comprise program code instructions configured to update or generate map data based on the map geometry.

In yet a further example embodiment, an apparatus is provided including means for receiving a first image and probe data associated with the first image, means for categorizing pixels of the first image based on the probe data, and means for generating a map geometry based on the pixel categorization of the first image.

In an example embodiment, the apparatus also means for receiving a second image, means for categorizing pixels of the second image based on the categorization of the pixels of the first image, and means for generating a map geometry based on the pixel categorization of the second image. In some example embodiments of the apparatus, the categorizing pixels of the first image is based on probe data density. In an example embodiment, the apparatus also includes means for determining a target center based on probe data density, and the categorizing pixels is based on the target center.

In some example embodiments of the apparatus, the means for categorizing pixels includes means for categorizing pixels as target pixels and non-target pixels. In an example embodiment, the apparatus also includes means for determining a target confidence value of pixels of the first image based on the probe data, and the categorizing pixels is based on the target confidence value of the respective pixel satisfying a predetermined target confidence value threshold. In some example embodiments, the apparatus also includes means for updating or generating map data based on the map geometry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Figure 1:
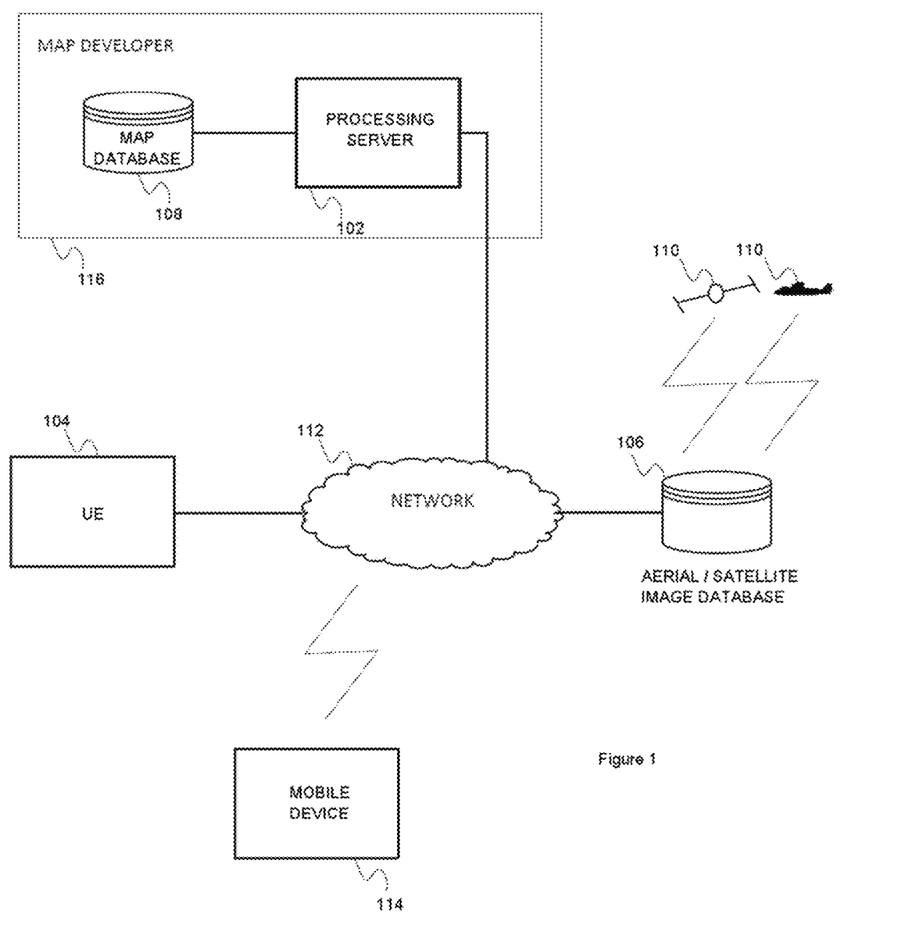
FIG. 1 illustrates a communications diagram in accordance with an example embodiment of the present invention.

A method, apparatus and computer program product are provided in accordance with an example embodiment for generating map geometry based on a received image and probe data. FIG. 1 illustrates a communication diagram including, a map developer system 116, a processing server 102 in data communication with a user equipment (UE) 104, an image database 106, and/or a geographic map database, e.g. map database 108 through a network 112, image capture devices 110, and one or more mobile devices 114. The mobile device 114 may be associated, coupled, or otherwise integrated with a vehicle. Additional, different, or fewer components may be provided. For example, many mobile devices 114 may connect with the network 112. The developer system 116 may include computer systems and networks of a system operator, such as HERE or NOKIA Corporation. The processing server 102 may include the image database 106 and/or the map database 108, such as a map or image data memory, or be associated with the image database 106 and/or the map database 108, such as a remote map or image data server. The network may be a wired, wireless, or any combination of wired and wireless communication networks, such as cellular, WiFi, internet, local area networks, or the like.

The UE 104 may be a mobile computing device such as a laptop computer, tablet computer, mobile phone, smart phone, navigation unit, personal data assistant, watch, camera, or the like. Additionally or alternatively, the UE 104 may be a fixed computing device, such as a personal computer, computer workstation, kiosk, office terminal computer or system, or the like. The processing server 102 may be one or more fixed or mobile computing devices. The processing server 102 may be in data communication with or otherwise associated with a camera 110.

The map database 108 may include node data, road segment data or link data, point of interest (POI) data, or the like. The map database 108 may also include cartographic data, routing data, and/or maneuvering data. In exemplary embodiments, the road segment data records may be links or segments representing roads, streets, or paths, as may be used in the calculated route or recorded route information for determination of one or more personalized routes. The node data may be end points corresponding to the respective links or segments of the road segment data. The road link data and the node data represent a road network, such as used by vehicles, cars, and/or other entities. Alternatively, the map database 108 may contain path segment and node data records or other data that represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 108 can include data about the POIs and their respective locations in the POI data records. The map database 108 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, constructions, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, the client side map database 108 may represent a compiled navigation database that may be used in or with end user devices (e.g., UEs 104) to provide navigation and/or map-related functions. For example, the map database 108 may be used with the end user device 104 to provide an end user with navigation features. In such a case, the map database 108 can be downloaded or stored on the end user device UE 104 can access the map database 108 through a wireless or wired connection, such as via a processing server 102 server and/or the network 112, for example.

In one embodiment, the end user device or UE 104 can be an in-vehicle navigation system, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the device UE 104 for navigation and map functions such as guidance and map display, for example, and for determination of one or more personalized routes or route segments based on one or more calculated and recorded routes, according to exemplary embodiments.

The camera 110 may be a fixed image camera, a video camera, a radar or light detection and ranging (LIDAR) sensor capable of generating an image, or the like. The image may be an aerial image, e.g. an image captured from a substantially downward observation point, such as a satellite image or aerial photography from a plane. The images may be directly stored in the image database 106 or transmitted to the processing server 102.

The processing server 102 may receive one or more images from the camera 112 or from the image database 106. The images may include or be associated with location information identifying a geographic location corresponding to the subject of the image. For example, the image may include or be associated with one or more geographical reference points, such as a global position sensor (GPS) coordinates. In an example embodiment, the image may include a latitude and longitude coordinate assigned according to a datum, such as world geodetic system (WGS) 84. The processing server 102 may store the one or more images in the image database 106 for later processing or for system analysis.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 receives location data from the positioning system. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. The probe data may include, without limitation, location data, (e.g. a latitudinal, longitudinal position, and/or height, GPS coordinates, proximity readings associated with an radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The probe data may be associated with the image based on location information. For example, the probe data may be associated with the image by correlating the location data with one or more geographical reference points or pixel coordinates or georeferenced pixels associated with the image or individual pixels. In an example embodiment the probe data and the image may be associated by user designation. The mobile device 114, may be any device capable of collecting at least location data and time data. Some examples of the mobile device 114 may include specialized vehicle mapping equipment, navigational systems, mobile devices, such as phones or personal data assistants, or the like.

Figure 4:
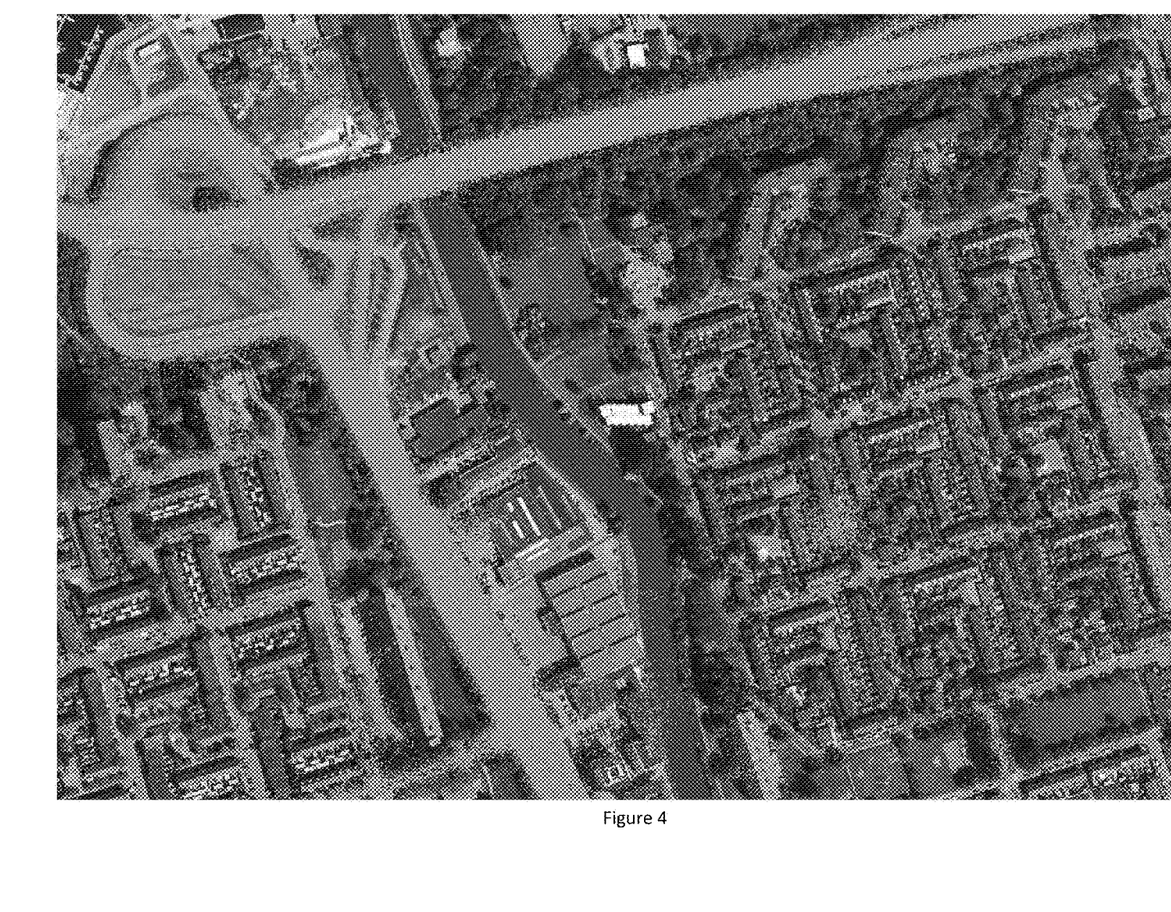
FIG. 4 illustrates an example probe data overlay of an aerial image in accordance with an embodiment of the present invention.

The processing server 102 may categorize pixels of the image based on the probe data. The processing server 102 may categorize pixels as target and non-target pixels, such as "road" and "not road." Roads are used as an example target, although it would be immediately understood by one of ordinary skill in the art that, other targets could also be determined and categorized, such as trails, paths, or the like for road vehicles, off-road vehicles and/or pedestrians. In an example embodiment, the processing server 102 may correlate probe data with the image based on the location information and the one or more geographical reference points, as depicted in FIG. 4.

In an example embodiment, pixels that are associated with probe data may be categorized as target pixels, and pixels which are not associated with probe data may be categorized as non-target pixels. In some embodiments, the processing server 102 may set a radius around probe data in which the pixels may be categorized as target pixels.

In an example embodiment, the processing server 102 may associate pixels directly associated with probe data, e.g. overlying, with the probe data. Additionally or alternatively, the processing server may associate pixels in a predetermined radius of the probe data locations with the probe data.

The processing server 102 may generate a probe data density map, e.g. a heat map, by overlaying multiple probe data onto the image. The probe data density map may depict the aggregate probe data plotted in association with each pixel. For example, pixels which are associated with more probe data plots may have a higher probe data density than pixels associated with fewer probe data plots. An example probe data density map is depicted in FIG. 5.

Figure 5:
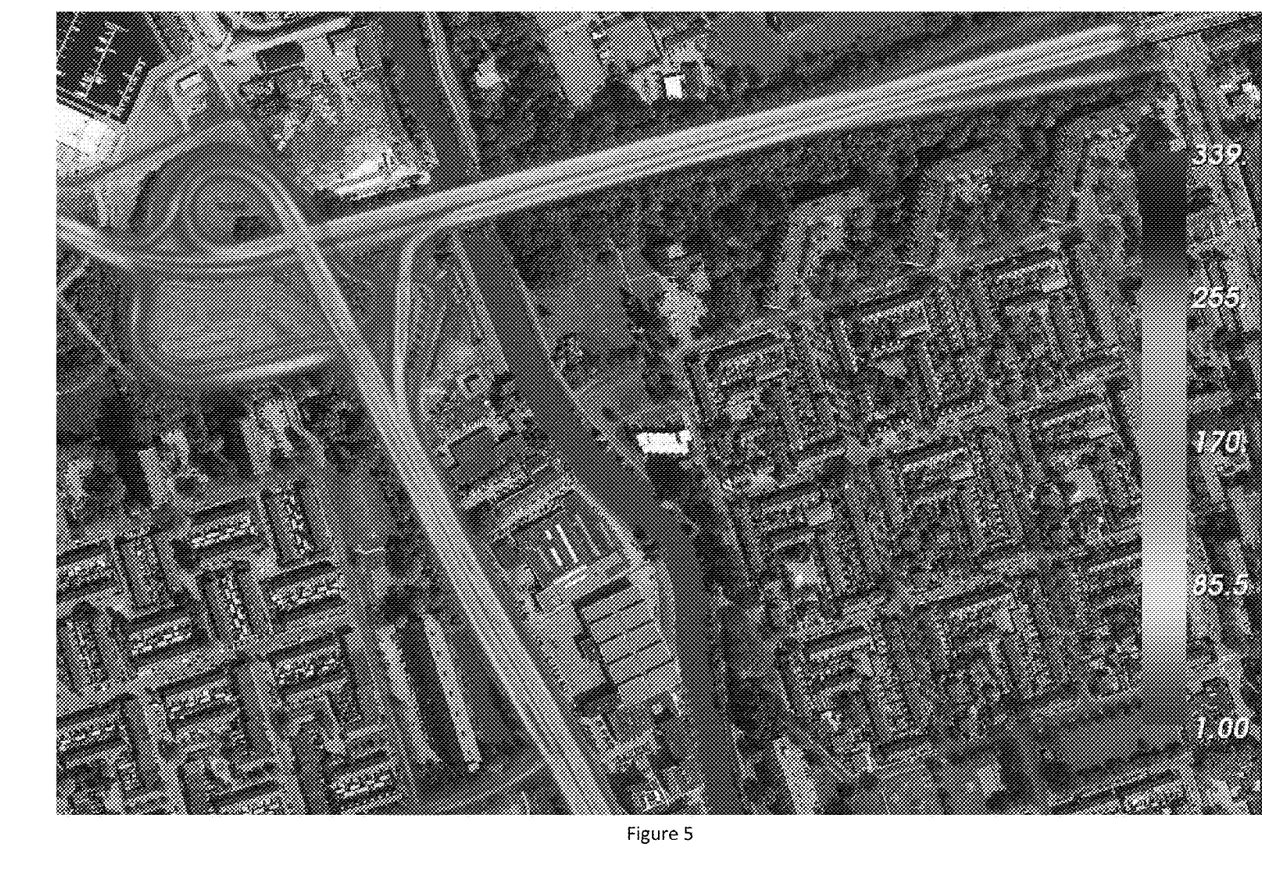
FIG. 5 illustrates an example probe data density map in accordance with an embodiment of the present invention.

In the example probe data density map of FIG. 5, the higher probe data density is indicated by blue color shift (399 observations, e.g. probe data plots) and lower probe data density is depicted with a red color shift (1 observation). The highways depicted have significant green and blue areas depicting significant probe data density, which may be based per pixel or a predetermined unit of surface area of the ground associated with the road. In contrast, city roads and off ramps are depicted with a red indicating a lower number of observations.

Figure 6:
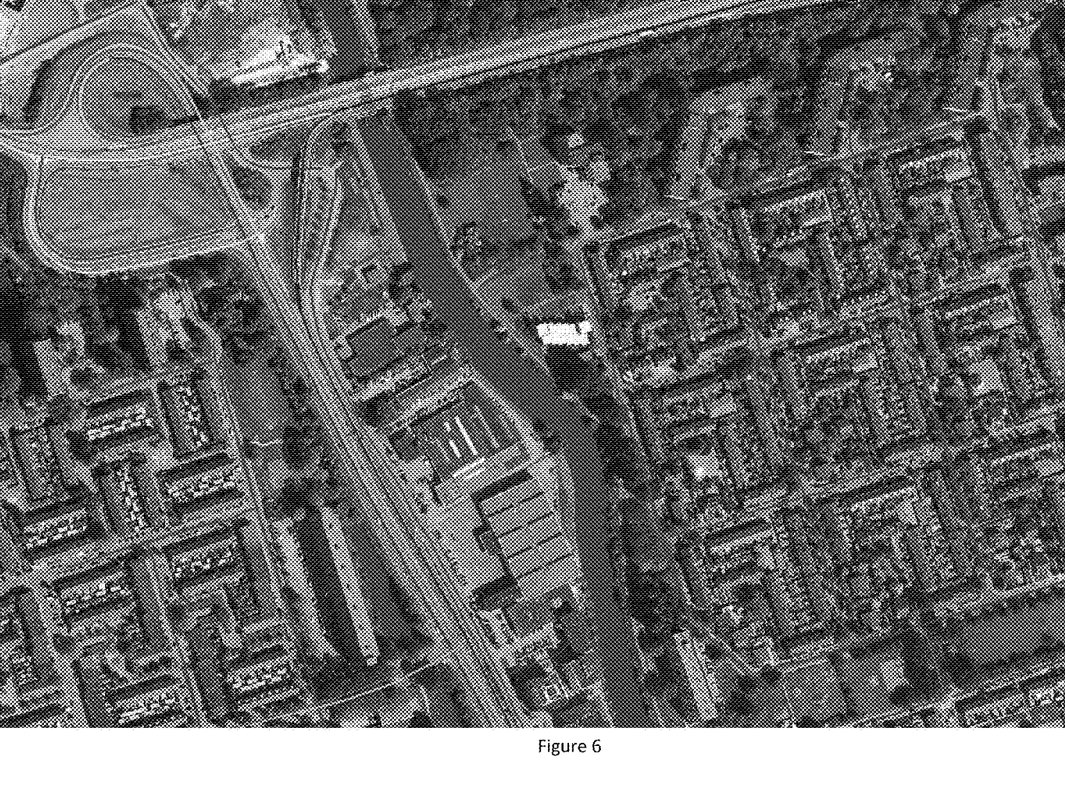
FIG. 6 illustrates an example target center overlay of an aerial image in accordance with an embodiment of the present invention.

In an example embodiment, the processing server 102 may determine a target center, e.g. road center, based on the probe data density, such as the highest data probe density or a center of a higher probe data density area, such as a probe data density that is which satisfies a predetermined threshold relative to surrounding probe data density or predetermined probe data density threshold for the image, such as number of observations. The determination of a target center may permit probe data noise to be reduced by using the highest probe data density and/or areas around the highest probe data density as the basis for pixel categorization reducing the effect of outlier probe data. FIG. 6 depicts target center lines for roads based on the probe density map of FIG. 5. The processing server 102 may categorize the pixels associated with a target center as target pixels and pixels not associated with the target center as non-target pixels. In some example embodiments, the processing server may categorize pixels within a predetermined radius of the target center as target pixels and pixels outside of the predetermined radius as non-target pixels. In an example embodiment, the processing server 102 may categorize pixels which are within a first predetermined radius of the target center as target pixels, pixels between the first predetermined radius and a second predetermined radius as "unknown" pixels, and pixels outside of the second predetermined threshold as non-target pixels.

In some example embodiments the processing server 102 may use additional probe data such as direction of travel to determine target (e.g. road) center, target width, target edges, and/or pixel classifications. Since GPS location data may be noisy, e.g. varying accuracy to actual locations, some GPS location data form the probe data may not be located on the road, but typical noise characteristics may yield the highest probe data density at the road center, in each direction of travel, and lower probed data density as distance to road center increases. The processing server 102 may use direction of travel data associated with the probe data to infer a direction of travel of the respective probe data density areas, e.g. separate the probe data density into respective directions of travel. Using the direction of travel, the processing server 102 may derive the perpendicular direction to the road and thus the direction of a road edge. The processing server 102 may use the probe data density consistent with local road direction to infer a target confidence value. The local density technique, e.g. using density of the probe data and direction of travel associated with a pixel and neighboring pixels, may allow for computation of a local histogram of probe data density of the target, e.g. road, in each direction of travel and estimate the probe data density of the road edge based on the total number of probes in a road cross section histogram.

Additionally or alternatively, the processing server 102 may use speed and/or direction of travel associated with the probe data to classify pixels as non-target, e.g. non-road. For example, the parking lots may have a high probe data density associated with a relatively low speed and noisy headings, the processing server 102 may classify these pixels as non-target pixels.

In some example embodiments, the processing server 102 may determine a target confidence value of the pixels. The processing server 102 may assign a value to each pixel associated with probe data or pixels that are within a predetermined radius of the probe data. For example, a value of 1 may be assigned for a pixel associated with the probe data and a value of 0.5 assigned to pixels which are within the predetermined radius of the probe data. The processing server 102 may aggregate the assigned values based on the respective probe data for a target confidence value. For example, the target confidence value may be the sum of the values assigned to each pixels for the respective probe data.

The processing server 102 may compare the target confidence value to a predetermined target value threshold. Pixels which satisfy e.g. exceed, the predetermined target value threshold may be categorized as target pixels and pixels which fail to satisfy the target confidence value threshold may be categorized as non-target pixels. In some example embodiments, the processing server 102 may compare the target confidence values for the pixels to a second confidence value threshold. Pixels which satisfy, e.g. are lower than the second confidence value may be categorized as non-target pixels, pixels which fail to satisfy the first and second confidence value threshold, e.g. the confidence value falls between the thresholds, may be designated as "unknown." Pixels designated as unknown may be excluded from further processing.

In some example embodiments, the processing server 102 may generate target, e.g. road, segments or networks based on the probe data. The target segments or networks may be generate using techniques including without limitation, trajectory clustering, kernel density maps, principal curves or graphs, gradient techniques, or the like. The processing server 102 may use one or more of these techniques to estimate curves of polylines for the target center and may infer target geometry in each direction of travel and/or lanes of travel. The target center geometry may follow regions with the highest probe data density, but may be additionally smoothed by statistical techniques or curve fitting regression methods. The target segments may be associated with a confidence value, which may be for the length of the target segment or may vary along the target segment based on the probe data, probe data density, variance between probe data density and determined road geometry, e.g. amount of smoothing, or the like. The processing server 102 may additionally use the probe data density with respect to the target geometry to compute the distance from target center where pixels are likely to be target pixels. The processing server 102 may classify pixels as target, non-target, or unknown pixels based on the derived target geometry.

In some example embodiments, the processing server 102 may additionally validate the pixel categorization, such as during a machine learning training stage. The pixel categorization may be validated by a user or in some instances known georeferenced maps, e.g. maps which include a verified target location, may be used for pixel categorization validation.

The map sever 102 may generate a map geometry based on the pixel categorization of the image. The processing server 102 may generate the map geometry based on pixels which have been categorized as target pixels, e.g. roads. The processing server 102 may store the map geometry in a memory, such as the map database 108 for further processing. The processing server 102 may generate or update map data for association with the geographic location based on the map geometry. For example, the processing server 102 may add, remove, or alter the location of roads, based on the map geometry.

The processing server 102 may store one or more images with pixel categorization to a memory, such as the image data base 106. Similarly, the processing server map store the generated or updated map data in a memory, such as the map database 108. The processing server 102 may retrieve and/or transmit the generated or updated map data to one or more UEs 102 for navigation or reference purposes.

In an example embodiment, a processing server 102, which may be the same or another processing server, may receive a second image. The processing server 102 may categorize pixels of the second image based on the pixel categorization of the first one or more images. The processing server 102 may be trained using the one or more pixel categorized first images.

The processing server 102 may receive one or more pixel categorized images from the image server 106. The processing server 102 may use the pixel categorized images as a machine learning input, to identify pixels or pixel groups that correspond to a target, such as a road, and pixels that correspond to a non-target, such as not-road, in the second image. The processing server 102 machine learning may be a pattern recognition algorithm, such as a classifier algorithm, matching algorithm, or the like. The pattern recognition accuracy may be associated with the quality and/or quantity of the pixel categories images used to train the processing server 102.

The processing server 102 may categorize pixels of the second image using pattern recognition. The processing server 102 may be trained using one or more images. The training images may include inferred or categorized target, non-target, and/or unknown pixels based on probe data, as discussed above. The processing server 102 may collect a feature vector for each categorized pixel. The feature vector may be a red-green-blue (RGB) value of a pixel square centered on the pixel of interest, for example a 32×32 pixel square. In this example 3072 feature values may be collected from the pixel window.

The processing server 102 may supply the feature vector and pixel categorization to a machine learning algorithm, such as a convolution neural network. The algorithm may be used, by the processing server 102, to train a model which may be used to classify pixels of new images. The processing server 102 may extract features from the new, e.g. second, image, such as the features of a 32×32 pixel square. The model may classify or infer a score which may be used to categorize or assign a probability value for the pixel.

In an example embodiment, the categorization may be binary categorization, such as a binary categorization between target and non-target pixels.

In some example embodiments, the processing server 102 may determine probability values associated with the respective pixels, e.g. probability of target. The processing server 102 may categorize pixels of the second image using the probability values in a manner substantially similar to the target confidence value with a target confidence value threshold determination, as discussed above. In an example embodiment, the processing server 102 may determine the target center based on the probability values, such as the center of probable target pixels or the highest probability value pixels. The processing server 102 may categorize pixels of the second image based on radii associated with the target center in a manner substantially similar to the target center categorization discussed above.

The processing server 102 may also generate a map geometry based on the pixel categorization of the second image and generate or update map data based on the map geometry in a manner substantially similar to the generation of the map geometry and generation or updating of map data for the first image as discussed above. The generation of the geometry map may be additionally based on observed probe data, as discussed above with respect to the first image.

Example Apparatus

Figure 2:
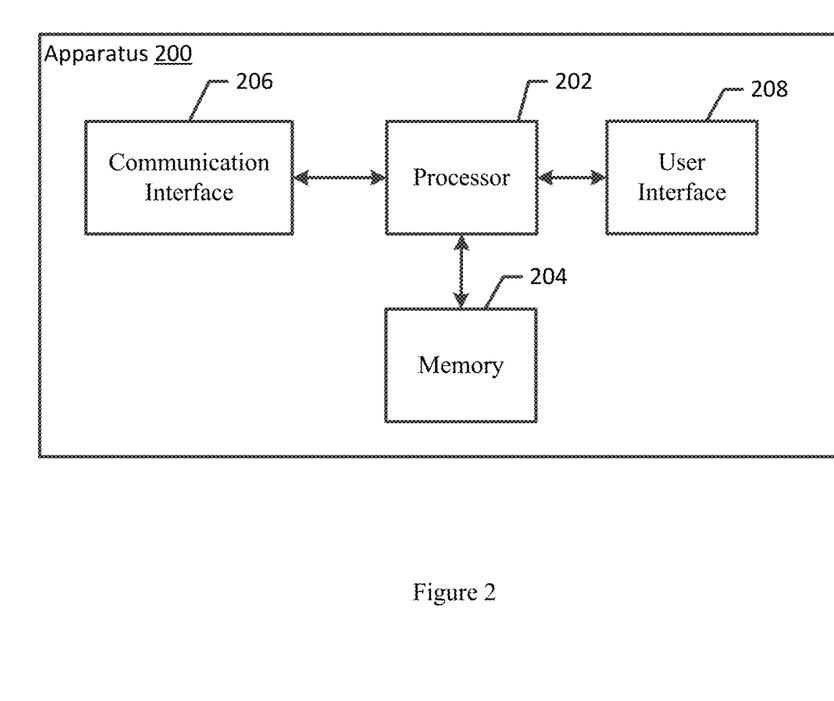
FIG. 2 is a block diagram of an apparatus that may be specifically configured for generating map geometry based on a received image and probe data in accordance with an example embodiment of the present invention.

A processing server 102 may include or otherwise be associated with an apparatus 200 as shown in FIG. 2. The apparatus, such as that shown in FIG. 2, is specifically configured in accordance with an example embodiment of the present invention for generating map geometry based on a received image and probe data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 104, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Figure 7:
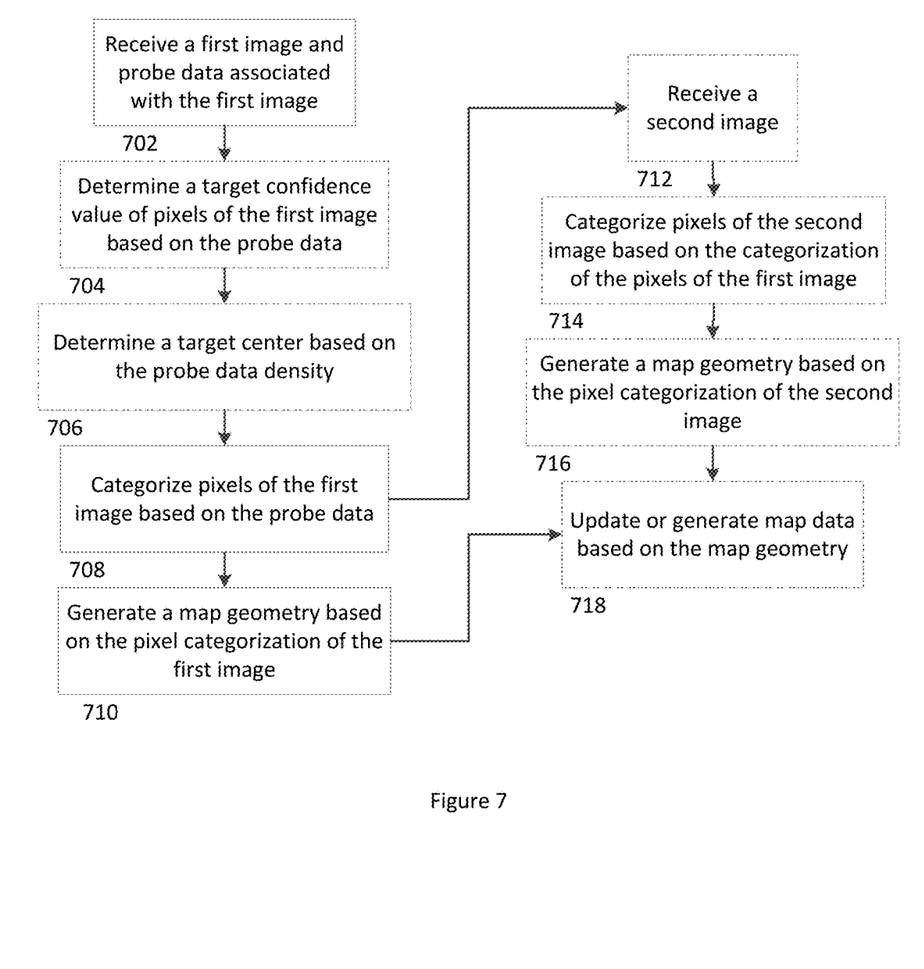
FIG. 7 illustrates an example process for generating a map geometry based on a received image and probe data in accordance with an embodiment of the present invention.

Example Process for Generating Map Geometry Based on a Received Image and Probe Data Referring now to FIG. 7, the operations performed, such as by the apparatus 200 of FIG. 2, for generating map geometry based on a received image and probe data are illustrated. As shown in block 702 of FIG. 7, the apparatus 200 may include means, such as a processor 202, memory 204, a communications interface 206, or the like, configured to receive a first image and probe data associated with the image. The processor 202 may receive the image from the communications interface 206, which may in turn receive the image from a memory 204, such as an image database 106, or from a camera 110. The processor 202 may receive the probe data from the communications interface 206, which in turn may receive the probe data from a memory 204, such as the map database 108, or from one or more mobile devices 114.

The image may be an aerial image, e.g. an image captured form a substantially downward perspective, such as a satellite image. The images may include or be associated with location information identifying a geographic location corresponding to the subject of the image. For example, the image may include or be associated with one or more geographical reference points, such as a GPS coordinates.

The probe data may include without limitation, location data, (e.g. a latitudinal and longitudinal position, GPS coordinates, proximity readings associated with an RFID tag, height, or the like), rate of travel, (e.g. speed), direction of travel, (e.g. bearing, cardinal direction, or the like), device identifier, (e.g. vehicle identifier, user identifier, or the like), a time stamp associated with the data collection, or the like. The probe data may be associated with the image based on location information. For example, the probe data may be associated with the image by correlating the location data with one or more geographical reference points or pixel coordinates or geo-referenced pixels associated with the image or individual pixels. In an example embodiment the probe data and the image may be associated by user designation.

As shown in block 704 of FIG. 7, the apparatus 200 may include means, such as a processor 202, or the like, configured to determine a target confidence value of pixels of the first image based on the probe data. The processor 202 may associate probe data with image pixels based on the probe location information and geo-referenced image pixels or images pixels associated with one or more geographical reference points. The processor 202 may generate a probe data density map, e.g. a heat map, by correlating multiple probe data with the image. The probe data density map may depict the aggregate probe data correlated in association with each pixel. For example, pixels which are associated with more probe data plots may have a higher probe data density than pixels associated with fewer probe data plots. An example probe data density map is depicted in FIG. 5, higher probe data density is indicated by a blue color shift (399 observations, e.g. probe data plots) and lower probe data density is depicted with a red color shift (1 observation). The processor 202 may assign a value to each pixel associated with probe data or pixels that are within a predetermined radius of the probe data. For example, a value of 1 may be assigned for a pixel associated with the probe data and a value of 0.5 assigned to pixels which are within the predetermined radius of the probe data. The processor 202 may aggregate the assigned values based on the respective probe data for a target confidence value. As shown at block 706, of FIG. 7, the apparatus 200 may include means, such as a processor 202, user interface 208, or the like, configured to determine a target center based on the probe data density. The processor 202 may determine the target center, e.g. road center, based on the probe data density, such as the highest data probe density or a center of a higher probe data density area.

In some example embodiments, the processor 202 may use additional probe data such as direction of travel to determine target (e.g. road) center, width, edges, and/or pixel classifications. The processor 202 may use direction of travel data associated with the probe data to infer a direction of travel of the respective probe data density areas, e.g. separate the probe data density into respective directions of travel. Using the direction of travel, the processor 202 may derive the perpendicular direction to the road and thus the direction of a road edge. The processor 202 may use the probe data density consistent with local road direction to infer a target confidence value.

As shown at block 708 of FIG. 7, the apparatus 200 may include means, such as a processor 202, or the like, configured to categorize pixels of the first image based on the probe data. The processor 202 may associate pixels associated with, e.g. underlying, the probe data, with the probe data. In some example embodiments, the processor 202 may also associate pixels within a predetermined radius of the probe data with the probe data. The processor 202 may categorize pixels associated with probe data as target pixels and pixels not associated with the probe data as non-target pixels.

In an example embodiment, in which target confidence values have been determined for the respective pixels, the processor 202 may compare the target confidence value to a predetermined target value threshold. Pixels which satisfy e.g. exceed, the predetermined target value threshold may be categorized as target pixels and pixels which fail to satisfy the target confidence value threshold may be categorized as non-target pixels. In some example embodiments, the processor 202 may compare the target confidence values for the pixels to a second confidence value threshold. Pixels which satisfy, e.g. are lower than, the second confidence value may be categorized as non-target pixels, pixels which fail to satisfy the first and second confidence value thresholds, e.g. the confidence value falls between the thresholds, may be designated as "unknown." Pixels designated as unknown may be excluded from further processing.

In some example embodiments, the processor 202 may categorize pixels associated with the target center as target pixels. The processor 202 may additionally or alternatively categorize pixels within a predetermined radius of the target center as target pixels. Pixels which are not categorized as target pixels may be categorized as non-target pixels. In an example embodiment, the processor 202 may categorize pixels which are within a first predetermined radius of the target center as target pixels, pixels between the first predetermined radius and a second predetermined radius as "unknown" pixels, and pixels outside of the second predetermined threshold as non-target pixels.

In an example embodiment, the pixel categorization may be validated by a user, using a user interface 208. In some example embodiments, the pixel categorization may be validated by comparison to a known target geometry, such as a known georeferenced road geometry.

Additionally or alternatively, the processor 202 may use speed and/or heading associated with the probe data to classify pixels as non-target, e.g. non-road.

In some example embodiments, the processor 202 may generate target segments or target networks, e.g. road segments or road networks, based on the probe data. The processor 202 may estimate curves of polylines for the target center and may infer target geometry in each direction of travel and/or lanes of travel. The processor 202 may also use the probe data density with respect to the target geometry to compute the distance from target center where pixels are likely to be target pixels. The processor 202 may classify pixels as target, non-target, or unknown pixels based on the derived target geometry.

The processor 202 may store categorized pixel images to a memory 204, such as the image database 106. The process may continue at block 710 by generating map data or 712 receiving a second image.

As shown at block 710 of FIG. 7, the apparatus 200 may include means, such as a processor 202, memory 204, or the like, configured to generate a map geometry based on the pixel categorization of the first image. The processor 202 may generate the map geometry based on pixels which have been categorized as target pixels, e.g. roads. The processor 202 may store the map geometry in a memory 204, such as the map database 108 for further processing, such as block 718 for updating or generating map data.

As shown at block 712 of FIG. 7, the apparatus 200 may include means, such as a processor 202, memory 204, communication interface 206, or the like, configured to receive a second image. The processor 202 may receive the second image from the communications interface 206, which may in turn receive the image from a memory 204, such as the image data base or a camera 110.

As shown at block 714 of FIG. 7, the apparatus 200 may include means, such as a processor 202, memory 204, or the like, configured to categorize pixels of the second image based on the categorization of the pixels of the first image. The processor 202 may use the pixel categorized image associated with at least the first image as a machine learning input, to identify pixels or pixel groups that correspond to a target, such as a road, and pixels which correspond to non-target, such as not road, in the second image. The processor 202 machine learning may be a pattern recognition algorithm, such as a classifier algorithm, matching algorithm, or the like.

The processor 202 may categorize pixels of the second image using pattern recognition. The categorization may be binary categorization, such as target or non-target, based on pattern matching.

In an example embodiment, the processor 202 may assign a target value confidence to pixels based on a probability values associated with the pattern recognition. The processor 202 may categorize pixels as target pixels, non-target pixels and/or unknown pixels based on a target confidence value with a target confidence value threshold determination, substantially similar to the target confidence value threshold determinations discussed above at block 708. In some example embodiments, the processor 202 may determine a target center based on the probability values associated with the pattern recognition, such as the center of a high probability target cluster or highest probability pixels. The processor 202 may categorize pixels as target pixels, non-target pixels, and/or unknown pixels based on the target center and predetermined radii, as discussed above at block 708.

In an example embodiment, the image and associated pixel categorization may be stored in a memory 204, such as the image database 106 for later processing.

As shown at block 716 of FIG. 7, the apparatus 200 may include means, such as a processor 202, memory 204, or the like, configured to generate a map geometry based on the pixel categorization of the second image. The processor 202 may generate the map geometry in a manner substantially similar to the generation of a map geometry of the first image as discussed above at block 710.

In some example embodiments, the processor 202 may cause the map geometry to be stored in a memory 204, such as the map database 108, for later processing.

As shown in block 718 of FIG. 7, the apparatus 200 may include means, such as a processor 202, memory 204, communications interface 206, or the like, configured to update or generate map data associated based on the map geometry. For example, the processor 202 may add, remove, or alter the location of roads, based on the map geometry.

The processor 202 may cause the generated or updated map data to be stored in a memory, such as the map database 108. The processing server 102 may retrieve and/or transmit the generated or updated map data to one or more UEs 102 for navigation or reference purposes.

Generating map geometry and associated map data from aerial images and probe data allows for identification of targets, such as pixels from an aerial image in areas in which known georeferenced map geometry is insufficient in coverage or precision. The probe data allows for automatic pixel categorization of the aerial image. Additionally, the pixel categorized images may be used in training for machine learning to identify target pixel in aerial images in the absence of probe data, allowing the processing of aerial images on a global scale to identify targets, such as roads, trails, paths or the like. The identified targets of the aerial images may be used to generate map geometries and generate or update map data including adding, removing, and altering road locations in areas with or without existing road coverage.

As described above, FIG. 7 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 704, 706, 712, 714, 716, or 718 in FIG. 7. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising: receiving, by at least one processor, a first image associated with image location data, wherein the first image was captured by an image capturing device; receiving, by the at least one processor, a plurality of instances of probe data, wherein (a) each instance of the probe data comprises probe location data determined by a positioning system of a mobile device, (b) the mobile device is coupled to a vehicle, and (c) the image capturing device is a distinct device from the mobile device and the image capturing device is not coupled to the vehicle;
   associating, by the at least one processor, the plurality of instances of probe data with the first image based on the probe location data correlating to at least a portion of the image location data;
   correlating, by the at least one processor, each instance of probe data with at least one pixel of the first image based on the image location data and the probe location data corresponding to the instance of probe data;
   generating, by the at least one processor, a probe data density map indicating; a probe data density of one or more pixels of the first image based on the correlation of the one or more instances of probe data with pixels of the first image, wherein the probe data density of a pixel of the first image corresponds to a number of instances of probe data that are correlated with the pixel;
   categorizing, by the at least one processor, pixels of the first image based on the correlation of instances of probe data with the pixels and the probe data density map; and
   generating, by the at least one processor; a map geometry based on pixel categorization of the first image.

2. The method of claim 1 further comprising:
   receiving a second image;
   categorizing pixels of the second image based on the categorization of the pixels of the first image; and
   generating a map geometry based on pixel categorization of the second image.

3. The method of claim 1, further comprising;
   determining a target center based on probe data density, and
   wherein the categorizing pixels is based on the target center.

4. The method of claim 1, wherein the categorizing pixels comprises categorizing pixels as target pixels and non-target pixels.

5. The method of claim 1 further comprising:
   determining a target confidence value of pixels of the first image based on the probe data, and
   wherein the categorizing pixels is based on the target confidence value of the respective pixel satisfying a predetermined target confidence value threshold.

6. The method of claim 1, further comprising:
   updating or generating map data based on the map geometry.

7. An apparatus comprising at least one processor and at least one memory including computer program code, the at least one memory and computer program code configured to, with the processor, cause the apparatus to at least:
   receive a first image associated with image location data, wherein the first image was captured by an image capturing device;
   receive a plurality of instances of probe data, wherein (a) each instance of the probe data comprises probe location data determined by a positioning system of a mobile device, (b) the mobile device is coupled to a vehicle, and (c) the image capturing device is a distinct device from the mobile device and the image capturing device is not coupled to the vehicle;
   associate the plurality of instances of probe data with the first image based on the probe location data correlating to at least a portion of the image location data;
   correlate each instance of probe data with at least one pixel of the first image based on the image location data and the probe location data corresponding to the instance of probe data;
   generate a probe data density map indicating a probe data density of one or more pixels of the first image based on the correlation of the one or more instances of probe data with pixels of the first image, wherein the probe data density of a pixel of the first image corresponds to a number of instances of probe data that are correlated with the pixel;
   categorize pixels of the first image based on the correlation of instances of probe data with the pixels and the probe data density map; and
   generate a map geometry based on pixel categorization of the first image.

8. The apparatus of claim 7, wherein the at least one memory and the computer program code are further configured to:
   receive a second image;
   categorize pixels of the second image based on the categorization of the pixels of the first image; and
   generate a map geometry based on pixel categorization of the second image.

9. The apparatus of claim 7, wherein the at least one memory and the computer program code are further configured to:
determine a target center based on probe data density, and wherein the categorizing pixels is based on the target center.

10. The apparatus of claim 7, wherein the categorizing pixels comprises categorizing pixels as target pixels and non-target pixels.

11. The apparatus of claim 7, wherein the at least one memory and the computer program code are further configured to:
determine a target confidence value of pixels of the first image based on the probe data, and
wherein the categorizing pixels is based on the target confidence value of the respective pixel satisfying a predetermined target confidence value threshold.

12. The apparatus of claim 7, wherein the at least one memory and the computer program code are further configured to:
update or generate map data based on the map geometry.

13. A computer program product comprising at least one non-transitory computer-readable storage medium having computer-executable program code portions stored therein, the computer-executable program code portions comprising program code instructions configured to:
receive a first image associated with image location data, wherein the first image was captured by an image capturing device;
receive a plurality of instances of probe data, wherein (a) each instance of the probe data comprises probe location data determined by a positioning system of a mobile device, (b) the mobile device is coupled to a vehicle, and (c) the image capturing device is a distinct device from the mobile device and the image capturing device is not coupled to the vehicle;
associate the plurality of instances of probe data with the first image based on the probe location data correlating to at least a portion of the image location data;
correlate each instance of probe data with at least one pixel of the first image based on the image location data and the probe location data corresponding to the instance of probe data;
generate a probe data density map indicating a probe data density of one or more pixels of the first image based on the correlation of the one or more instances of probe data with pixels of the first image, wherein the probe data density of a pixel of the first image corresponds to a number of instances of probe data that are correlated with the pixel;
categorize pixels of the first image based on the correlation of instances of probe data with the pixels and the probe data density map; and
generate a map geometry based on pixel categorization of the first image.

14. The computer program product of claim 13, wherein the computer-executable program code portions further comprise program code instructions configured to:
receive a second image;
categorize pixels of the second image based on the categorization of the pixels of the first image; and
generate a map geometry based on pixel categorization of the second image.

15. The computer program product of claim 13, wherein the computer-executable program code portions further comprise program code instructions configured to:
determine a target center based on probe data density, and wherein the categorizing pixels is based on the target center.

16. The computer program product of claim 13, wherein the categorizing pixels comprises categorizing pixels as target pixels and non-target pixels.

17. The computer program product of claim 13, wherein the computer-executable program code portions further comprise program code instructions configured to:
determine a target confidence value of pixels of the first image based on the probe data, and
wherein the categorizing pixels is based on is based on the target confidence value of the respective pixel satisfying a predetermined target confidence value threshold.

* * * * *